United States Patent Office 3,692,688
Patented Sept. 19, 1972

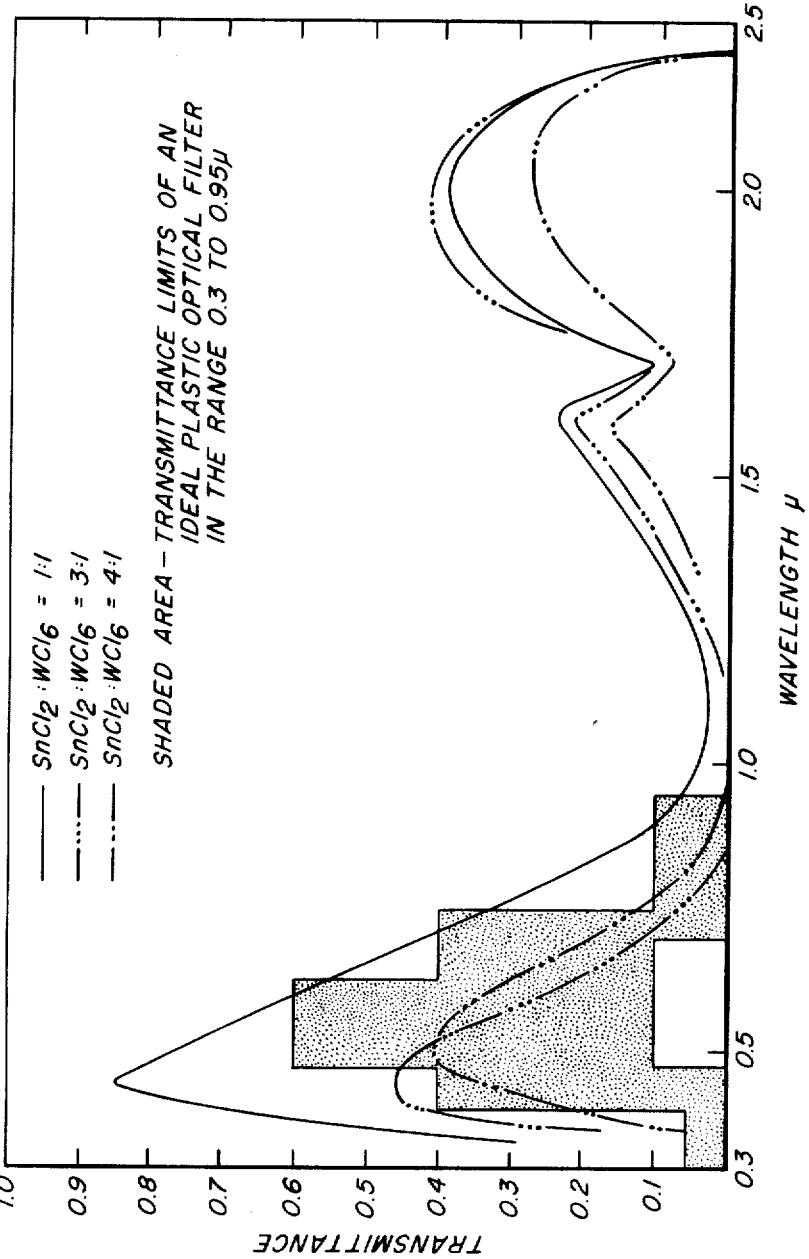

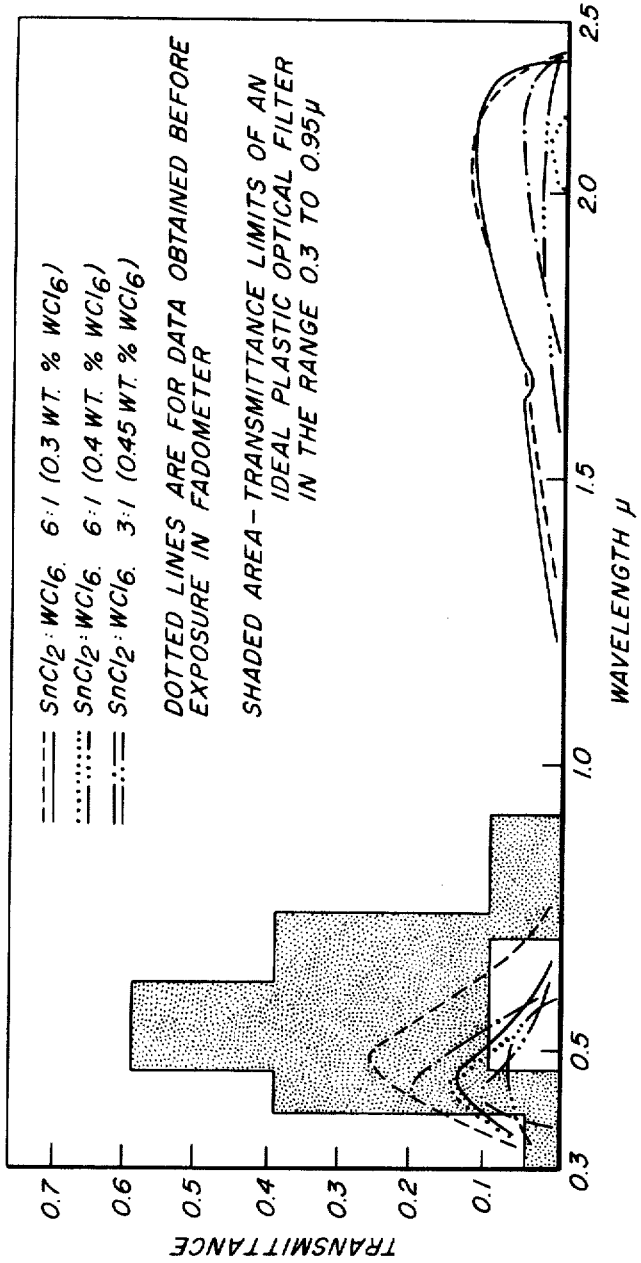

3,692,688
PLASTIC OPTICAL FILTER
George Augustus Castellion, Stamford, Conn., and Joseph Peter Habermann, North Salem, N.Y., assignors to American Cyanamid Company, Stamford, Conn.
Filed June 1, 1971, Ser. No. 148,662
Int. Cl. F21v 9/02; G02f 5/20
U.S. Cl. 252—300    3 Claims

ABSTRACT OF THE DISCLOSURE

Tungsten hexachloride and stannous chloride incorporated together as solutes in polymethylmethacrylate formulations produce a reduced tungsten species than filters infrared effectively while maintaining visible light transmittance. Plastic optical filters are made with the described composition.

---

Figure 1:
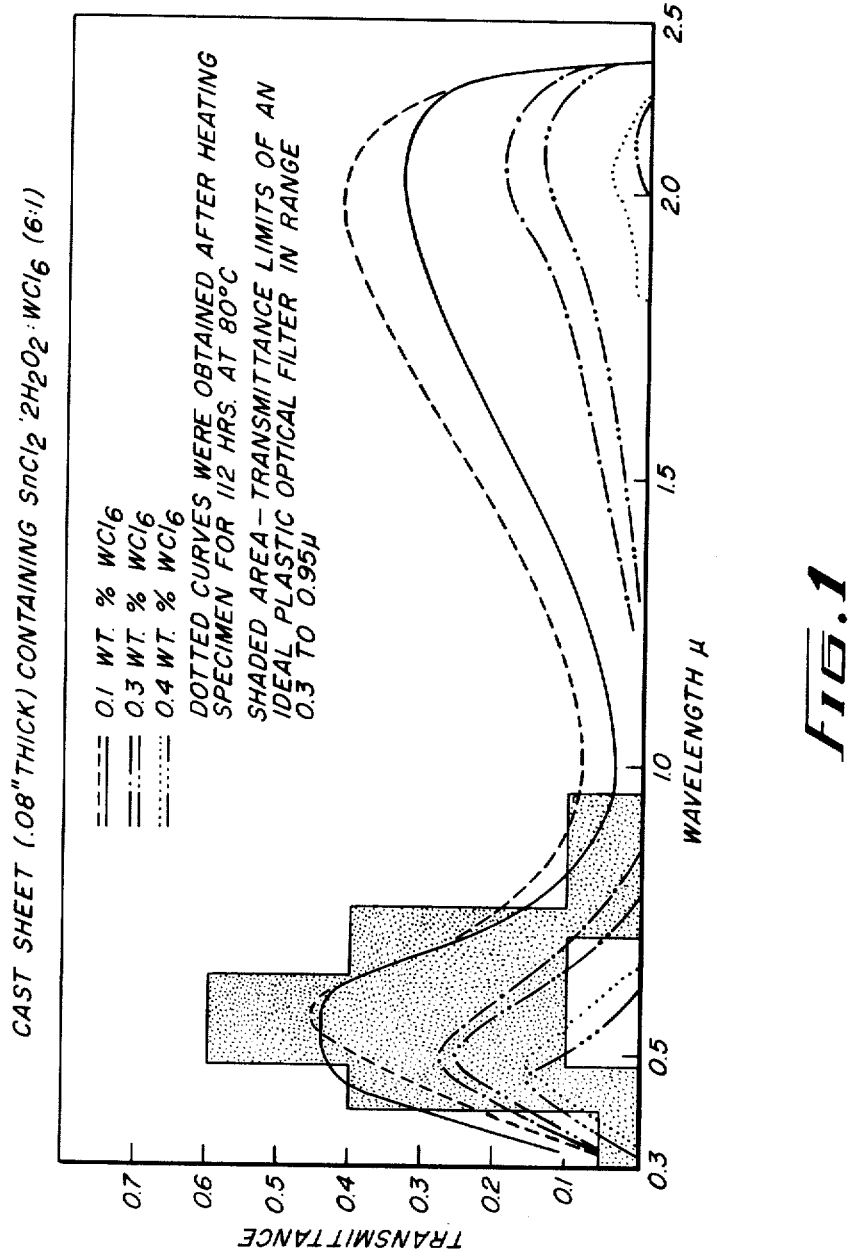

The invention relates to optical filters and particularly to filters for infrared, having haze-free transmittance in the visible range.

Tungsten hexachloride, $WCl_6$, and stannous chloride, $SnCl_2 \cdot 2H_2O$, both can be dissolved in prepolymer mixtures of methylmethacrylate monomers. By preparing a prepolymer mixture having dissolved therein both $WCl_6$ and $SnCl_2 \cdot 2H_2O$ and then polymerizing the mixture, the dissolved salts and their reaction product remain so finely dispersed in the solid polymethylmethacrylate (PMMA) resin that it remains essentially haze-free. A sheet of this solid resin with the included inorganics is found to efficiently filter near infrared radiation while retaining considerable transmittance of light in the visible region. This makes possible the fabrication of a variety of articles with PMMA resin that are at least partially transparent or translucent in the visible region and that have useful and effective infrared-filtering properties particularly good in the near infrared region. Examples of such articles which may be molded from the filter material are lenses for welding goggles, sunglasses, special window panes, heat screens and the like.

Tungsten hexachloride, $WCl_6$, is the soluble precursor for reduced tungsten compounds that are produced in situ by the reduction of $WCl_6$ with stannous chloride. Dissolved stannous chloride is effective in the prepolymer mixture, and probably in the polymerized resin also, as the reducing agent for reducing tungsten hexachloride. Optical properties of the reduced tungsten species in the infrared region indicate that one or more derived compounds with considerable electron delocalization have been formed in situ by reaction of the tungsten salt with the tin salt. The precise chemical nature of the derived reduced species is not yet fully analyzed but it is evident that it comprises reduced tungsten, probably a $W^{+3}$ or a $W^{+4}$ compound or both which appears to be the effective filter.

In the more preferred embodiments of the invention a molar excess of stannous chloride is used to improve the reduction of the tungsten, but such molar excess is not necessary.

In various embodiments of the invention the tungsten hexachloride is added in amounts from about 0.05 to about 1 wt. percent based on weight of the resin and preferably in the range from 0.2 to 0.5 wt. percent. The amount of stannous chloride added may range from about 1 to about 10 moles $SnCl_2$ per mole of tungsten hexachloride and preferably from about 3 to about 6 moles per mole.

In the drawings:

FIGS. 1–3 are spectral transmittance diagrams on which are graphically plotted value of the optical transmittance of radiant energy at wavelengths from 0.3 to 2.5 microns, as measured through several filter samples embodying the invention. All of these figures illustrate the good filtration found in the near infrared region above 0.7 micron and the selective transmission of visible light by the filter materials tested. The shaded area on these charts represents the transmittance characteristic of an ideal plastic optical filter, which is explained in more detail in U.S. Pat. No. 3,382,183, patented May 7, 1968, to H. C. Dononian et al.

FIG. 1 shows how the transmittance of both infrared and visible light are reduced as the tungsten concentration is increased within the preferred range. FIG. 2 illustrates the effects of varying the molar ratio of tin to tungsten within a defined range at a selected tungsten concentration. FIG. 3 shows the effects of Fadeometer testing on various samples.

Solubility of the chlorides of both tungsten and tin that are used, and the ease of reactivity of those compounds in the monomer make the fabrication or optical filters embodying the invention relatively simple. After dissolving the inorganic components in the monomer solution, the casting and polymerization may be carried out in any of several ways, the same as would be done to make clear plastic castings of the same resin. In variations of the invention, other materials may be incorporated together with the tungsten and tin reactants in the plastic material, either as included solids or as solutes, provided such other additives do not interfere with the reaction of the tin and tungsten compounds and do not render the plastic entirely opaque in the visible range of the spectrum. Examples of such other added materials in the plastic might include such things as selected dyes or pigments for additional optical effects, a raster screen or other visible index marks, light-diffusing or decorative additives, and the like.

Following are examples illustrating several preferred embodiments of the invention, with variations to illustrate versatility of the invention. Other variations and modifications may be made in filters that are not specifically described in these examples but which nonetheless would embody the invention described and claimed herein.

EXAMPLE 1

A casting composition is prepared as follows.

Dissolve 0.25 gram of $WCl_6$ in 12.3 gram of a prepolymer syrup consisting of 5 parts of polymethylmethacrylate an 95 parts of methylmethacrylate monomer.

Dissolve 0.427 gram of crystalline $SnCl_2 \cdot 2H_2O$ in another 12.0 gram sample of the same prepolymer syrup. Combine the two syrup solutions. The resulting 25 grams of stock solution contains 1 percent by weight tungsten hexachloride and 3 moles of stannous chloride per mole tungsten hexachloride. To make a casting composition containing 0.25 wt. percent $WCl_6$, mix 6.25 gram of the stock solution with 18.75 grams of a syrup containing 20 parts polymethylmethacrylate and 80 parts of methylmethacrylate. Add azobisisobutryonitrile catalyst to make a solution of 0.05 wt. percent catalyst. Thoroughly mix this casting composition; filter and degas the casting composition prior to casting.

A casting mold is made using two glass plates sprayed with conventional mold release agent and separated with 0.1 inch conventional spacer gasket. Through a paper funnel in the open end of the mold is poured the filtered casting composition described above. After the mold is filled, the ends are closed and the casting is heated at 60–70° C. for several hours until the composition is well gelled, then the temperature is increased to 100–105° C. for one hour. The mold is slowly cooled for about half an hour and then the glass plates are separated from the cast sheet. The resulting sheet is about 0.08 inch thick.

Two other sheets are made the same except the amount of stannous chloride is varied in each to give molar ratios $SnCl_2:WCl_6 = 1:1$ and $4:1$ respectively. The spectral transmittance of each of the three filter sheets made in this example is measured in the range from 0.3 to 2.5 microns. The transmittance characteristic curves of the three sheets are shown in FIG. 2 of the drawings.

EXAMPLE 2

Using the same procedure described in Example 1, but with variation of the amounts of tungsten hexachloride and stannous chloride, are made to yield three different sheets having, respectively, 0.1, 0.3 and 0.4 wt. percent tungsten hexachloride in the respective sheets and each containing 6 moles stannous chloride per mole of tungsten hexachloride. Each sheet is then measured for its spectral transmittance in the range from 0.3 to 2.5 microns. The sheets are then carefully heated in an oven at a constant temperature of 80° C. for 112 hours after which spectral transmittance measurements are again made for each sheet. In FIG. 1 of the drawings are shown the transmittance curves for each sheet as measured before and after heating.

EXAMPLE 3

Two sheets containing respectively 0.3 and 0.4 wt. percent $WCl_6$ with 6:1 ratio of stannous chloride are prepared the same as in Example 2 and an additional sheet is made having 0.45 wt. percent $WCl_6$ with 3:1 mole ratio stannous chloride to $WCl_6$. Spectral transmittance characteristics are measured for these three sheets before and after exposure of the sheets in a conventional Fadeometer for 500 hours. The transmittance curves are shown in FIG. 3 of the drawings.

As can be seen from FIG. 1, the optical properties of the reduced tungsten system in the infrared region indicates that a new compound with considerable electron delocalization was formed. On extended heating at 80° C. there is little change of the filtering action in the visible region but the transmittance in some portions of the infrared is increased. The sheets containing 0.1 wt. percent $WCl_6$ and 0.3 wt. percent $WCl_6$ conforms fairly closely to the properties of the ideal plastic optical filter. As illustrated in FIG. 2, the transmittance in the infrared region decreased as the mole ratio of stannous chloride to tungsten hexachloride was increased. A comparison of the curves shown in FIG. 2 with those shown in FIG. 1 suggests that, as far as transmittance in the infrared region is concerned, the magnitude of the mole ratio of stannous chloride is as important a factor as the concentration of the tungsten hexachloride in affecting the filtering efficiency. Although there was considerable undesirable darkening in the visible region by the Fadeometer texts, there was a much slighter change in the transmittance in the infrared region.

We claim:

1. An optical filter consisting essentially of solid polymethylmethacrylate having dispersed therein a compound which is the product of in situ reduction of from about 0.05 to about 1 wt. percent based on the weight of the polymethylmethacrylate of tungsten hexachloride with at least an equimolar amount of dissolved stannous chloride, in amount sufficient to reduce substantially the transmittance of near infrared radiation.

2. An optical light filter defined by claim 1 formed as a solid sheet.

3. A method of making an optical light filter comprising the steps of dissolving together into a prepolymer mix comprising methylmethacrylate monomer, from about 0.05 to 1 wt. percent based on weight of the methylmethacrylate monomer of tungsten hexachloride and at least an equimolar amount of stannous chloride and forming a solid optical filter by polymerization of the prepolymer mix.

References Cited

UNITED STATES PATENTS

| | | | |
|---|---|---|---|
| 3,623,866 | 11/1971 | Auerback | 252—30 P |
| 3,382,183 | 5/1968 | Donovan et al. | 252—30 P |

GEORGE F. LESMES, Primary Examiner

J. P. BRANNER, Assistant Examiner

U.S. Cl. X.R.

260—45.75, 89.5